United States Patent [19]
Morehouse et al.

[11] 3,966,971
[45] June 29, 1976

[54] SEPARATION OF PROTEIN FROM VEGETABLE SOURCES

[75] Inventors: Alpha L. Morehouse; Ronald C. Malzahn, both of Muscatine, Iowa

[73] Assignee: Grain Processing Corporation, Muscatine, Iowa

[22] Filed: Jan. 2, 1975

[21] Appl. No.: 538,127

[52] U.S. Cl................................ 426/44; 426/46; 195/5; 260/123.5
[51] Int. Cl.².......................................... A23L 1/20
[58] Field of Search ............... 195/4, 5; 426/49, 52, 426/431, 44, 46; 260/112 R, 123.5

[56] References Cited
UNITED STATES PATENTS

| | | | |
|---|---|---|---|
| 2,881,076 | 4/1959 | Sair | 426/431 |
| 3,733,207 | 5/1973 | McCabe | 195/4 |
| 3,761,353 | 9/1973 | Noe et al. | 426/52 |

OTHER PUBLICATIONS

Dixon et al., "Enzymes" Academic Press 1964, pp. 145–150.

*Primary Examiner*—A. Louis Monacell
*Assistant Examiner*—R. B. Penland
*Attorney, Agent, or Firm*—Neuman, Williams, Anderson & Olson

[57] ABSTRACT

Vegetable protein source materials are dispersed in water at a pH in the range of 2 to 6 and an acid phytase is included therein. The acidic extract containing soluble protein is separated and dried to yield a solid protein of desirable character. A protease can also be used to improve the characteristics of the protein.

5 Claims, No Drawings

SEPARATION OF PROTEIN FROM VEGETABLE SOURCES

This invention relates to separation of protein from vegetable materials.

The efficient separation of protein from sources such as soybeans, cottonseeds, peanuts, sesame seeds and others is desired because of the high nutritional value of proteins. Certain disadvantages attend the use of strongly alkaline or strongly acid conditions for extracting proteins which are to be used in foods. Thus, with strongly alkaline conditions of extraction, there is a tendency for undesirable color formation to occur. With strongly acid extracting conditions, there is the problem of excessive salt formation when the acid is eventually neutralized. On the other hand, with mildly acid extracting conditions the efficiency of the protein extraction is usually very poor because the isoelectric pH of most oilseed proteins is in the range of pH 3 to 6.

It is a principal object of this invention to provide a process for efficiently separating protein from vegetable sources.

It is a further object of this invention to provide a process for extracting from vegetable sources proteins which have good solubility and clarity when used in food compositions having a pH in the range of 3 to 5, such as beverages, both natural fruit and vegetable juices, imitation fruit flavored drinks and so-called "soft-drinks" which are acidic in nature.

It is a still further object of this invention to provide a process for extracting from vegetable sources proteins which, when utilized in acidic food compositions, do not impart an undesirable astringency, coating effect or unpleasant aftertaste thereto.

In accordance with the present invention, a particulate vegetable protein source material, such as soybean flakes or flour, is subjected to an isoelectric wash such as by suspending the material in water containing sufficient acid to maintain the pH at approximately the isoelectric pH of the particular vegetable protein source material being used. The term isoelectric wash in this application refers to the use of a water wash at the pH of minimum protein solubility of the crude protein-bearing material being treated. This washing step extracts undesirable color bodies, carbohydrates and only a very minor portion of the protein from the vegetable source material.

After the isoelectric wash the vegetable protein source material is resuspended in fresh water and the pH thereof is adjusted to a value between 2 and 6, preferably a pH between 3 and 5, using any suitable acid or base. For example, hydrochloric acid, sulfuric acid, citric acid, acetic acid, lactic acid, sodium hydroxide, potassium hydroxide, calcium hydroxide and the like can be used for pH adjustment. Naturally, if the pH of the resuspended protein is already in the desired range, no further adjustment of the pH may be necessary. Ordinarily, sufficient water is used in this step to provide a solids level of between about 5 and 15%, although more or less water can be used if desired. A quantity of acid phytase is added to the slurry and the mixture digested with or without agitation at a temperature in the range from about 30° to 70° C., preferably 45° to 55° C., for a period of time sufficient to hydrolyze a major part of the phytic acid present in the crude protein. The quantity of acid phytase used is generally in the range of 500 to 5000 units per pound of protein material. The hydrolysis of phytic acid is followed by the release of free phosphorus as orthophosphate and is considered substantially complete when the level of free phosphorus as determined by the Fiske-Subbarow Method (Fiske, C. H., and Subbarow, Y., The Colorimetric Determination of Phosphorus, *J. Biol. Chem.*, 66, 375 (1925)) reaches a maximum. The digestion time depends on temperature, pH and level of phytase employed and also on the particular protein material being extracted. Generally, digestion times of between about 4 and 24 hours are satisfactory.

After digestion of the protein source material and the acid phytase is complete, the liquid portion of the digestion mixture, which contains the solubilized protein, is separated from the insoluble residue. This can be accomplished by centrifugation or filtration or a combination of these procedures. In order to maximize recovery of the soluble protein, the insoluble residue should be washed with fresh water and the wash water added to the liquid extract. The pH of the liquid extract should be adjusted at this time to the value desired in the final product. For adjustment of the pH, acids such as hydrochloric acid, sulfuric acid, phosphoric acid and citric acid, and bases such as sodium hydroxide, calcium hydroxide, potassium hydroxide and sodium carbonate can be employed. Thereafter, the liquid extract can be concentrated under reduced pressure and subjected to drying operations such as, for example, spray drying or freeze drying, to yield dry solid protein.

When the mixture of enzymes and crude protein has digested for a suitable time, the entire digestion mixture can, if desired, be heated to an elevated temperature and held for a time to inactivate any residual enzyme remaining in the digestion mixture. Temperatures of 80°–100° C. for 10–30 minutes are usually satisfactory for enzyme inactivation. These conditions are not critical and other combinations of temperature and time may be used for enzyme inactivation. Heating to inactivate residual enzymes can be done either before the separation of solids and liquids or after the separation of solids and liquids.

The process of this invention is applicable for the separation of protein from a variety of vegetable sources, such as soybeans, peanuts, cottonseeds, sesame seeds, sunflower seeds, rapeseeds and the like. It is generally preferred to use defatted flakes or flour, although full fat oilseed flours can be utilized, if desired.

In accordance with a preferred, but optional, embodiment of the process of this invention, the vegetable protein source material is treated with a proteolytic enzyme. Treatment with the protease enzyme can be carried out after the acid phytase treatment or concurrently therewith by adding a protease along with the phytase and allowing both enzymes to act simultaneously. The proteases which have been found to be most satisfactory for use in this preferred embodiment of the invention are referred to as acid-fungal proteases which exhibit proteolytic activity in the pH range of 2 to 5. Such acid-fungal proteases and their production are well known to the art and acid-fungal proteases are available commercially. For example, two suitable commercial proteases are Miles Acid Fungal Protease and Wallerstein Acid Fungal Protease. Preferred fungal proteases are those derived from *Aspergillus niger*. The level of protease used can vary depending upon the protein source material, the potency of the enzyme and conditions of use. Usually it is used at a level which will provide only partial proteolytic breakdown of the vegetable protein during the digestion period. Since no satisfactory chemical or physical method for measuring the degree of proteolysis has been found, the desired amount of protease treatment is usually determined by evaluating the taste and smell of the hydrolyzate. When the degree of proteolysis is very small the protein extract retains some of the undesirable astringency and coating effect of the untreated sample. When proteolysis is carried too far, the hydrolyzate becomes increasingly bitter and takes on a characteristic hydrolyzed protein taste and smell.

Although the range of proteolysis which is considered as having acceptable taste properties varies widely, it has been found that products having between 40 and 85% TCA (Trichloroacetic Acid)-soluble protein (N × 6.25) are preferable to products showing less than 40 or more than 85% TCA-soluble protein.

Solubility of the protein in aqueous TCA is one method that can be used to establish the degree of proteolytic breakdown in the products prepared by the present invention. This method is based on the fact that intact unhydrolyzed protein is very insoluble in 10–15% aqueous TCA but the solubility increases gradually during proteolysis to 100%. The following procedure was based on a method of determining protein developed by Hoch and Vallie, *Analytical Chemistry*, 25, (1953):

Five milliliters of proteinaceous extract containing approximately 0.200 gram of sample are mixed with 10 milliliters TCA in a small centrifuge tube. The tube is warmed to 80° C. for 2 minutes and allowed to cool at room temperature 6 hours and centrifuged. The clear supernate is analyzed for nitrogen and the total TCA-soluble nitrogen compared with the total nitrogen of the original 5 milliliter sample to calculate the percent soluble in TCA.

The acid phytase which is employed in accordance with this invention is measured actively in units wherein one unit is that amount of enzyme which releases 1 milligram of phosphorus as orthophosphate from sodium phytate in 1 hour at pH 2 and at 37° C. Phosphorus is measured colorimetrically using the Fiske-Subbarow method. The preparation of acid phytase suitable for use in this invention is known and is described, for example, in U.S. Pat. No. 3,297,548, the disclosure of which is incorporated herein. One particularly suitable acid phytase for the purpose of the present invention is acid phytase produced by *Aspergillus niger* NRRL 3135.

The following examples further illustrate the process of the present invention and the advantages thereof.

EXAMPLE 1

Four hundred grams of white soy flakes containing 94% dry matter and 54.5% protein were stirred into 6 liters of tap water, the pH of which was continuously adjusted to 4.5 with hydrochloric acid. After one-half hour of stirring at pH 4.5, the flakes were separated by centrifugation and the residue washed with water one time. The supernatant liquid, also referred to as the isoelectric wash, was sampled for solids and protein determination and discarded. Analysis of the isoelectric wash based on 100 grams of the original soy flakes is shown in Table I.

TABLE I

| Material | Total Solids (grams) | Total Protein (grams) | % Protein Yield |
|---|---|---|---|
| White Soy Flakes | 94 | 54.5 | 100 |
| Isoelectric Wash | 28.4 | 5.7 | 10.5 |

The residue, containing 262 grams solids, from the isoelectric wash was then divided into four equal parts, each representing 100 grams of the original soy flakes. Each of the four aliquots was then suspended in one liter of water at a pH of 2.8. To one aliquot was added 0.1 gram of acid phytase produced from *Aspergillus niger* NRRL 3135 and having an activity of 6000 units/gram. To a second aliquot was added 0.1 gram of Wallerstein Company Acid Fungal Protease. To a third aliquot was added both the acid phytase and the protease in similar amounts. All four aliquots were then stirred at 50° C. for 10 hours. Thereafter, each suspension was heated to 95° C. for 10 minutes to kill the remaining enzymes, centrifuged and the insoluble residue washed once with water. Analysis of the acidic extract and acid residue for each sample are shown in Table II.

TABLE II

| Material | Total Solids (grams) | Total Protein (grams) | % Protein Yield |
|---|---|---|---|
| Acid Residue | | | |
| No.1 Control | 57.0 | 40.5 | 74 |
| No.2 0.1 gm Phytase | 32.0 | 17.4 | 32 |
| No.3 0.1 gm Wallerstein Acid Fungal Protease | 56.1 | 38.6 | 71 |
| No.4 0.1 Phytase, 0.1 gm Wallerstein Protease | 30.8 | 16.2 | 30 |
| Acid Extract | | | |
| No.1 Control | 11.5 | 8.54 | 16 |
| No.2 Phytase | 36.8 | 31.5 | 58 |
| No.3 Wallerstein Acid Fungal Protease | 13.7 | 13.3 | 24 |
| No.4 Phytase and Protease | 36.4 | 32.4 | 59 |

The above results show that the two samples treated with phytase had over three times as much protein in the acid extract as did the control.

Each of the four acid slurries was analyzed for free phosphorus periodically during the 10 hour digestion period. The results of Table III showed that the samples treated with phytase rapidly increased in free phosphorus while the other samples remained constant.

TABLE III

| Treatment | Effect of Enzymes on Free Phosphorus in Digestion Mixture | | | |
|---|---|---|---|---|
| | 0 Hour | 3 Hours | 6 Hours | 10 Hours |
| | mcgm P/ml | | | |
| 1 Control | 20 | 30 | 20 | 20 |
| 2 Phytase | 20 | 420 | 480 | 490 |
| 3 Protease | 20 | 80 | 60 | 60 |
| 4 Phytase + Protease | 20 | 460 | 510 | 540 |

EXAMPLE 2

Four hundred grams of white soy flakes were dispersed in 6 liters of tap water (25° C.) while adding 5N hydrochloric acid simultaneously to maintain the pH at 4.5. The slurry was stirred for 20 minutes, centrifuged and the flakes washed by resuspending in water at pH 4.5 and centrifuging again.

The washed flakes were resuspended in 4 liters of water and adjusted to pH 3.0 with hydrochloric acid. Phytase (6000 units/gram), 0.2 gram, and Miles Acid Fungal Protease, 0.4 gram, were added and the slurry stirred for 20 hours at 50° C. The pH after digestion was 3.6. The entire slurry was heated to 95° C. for 20 minutes, cooled and adjusted to pH 3.9 with sodium hydroxide. The slurry was centrifuged and the residue washed one time with water. The combined extracts were concentrated under vacuum to 2 liters and dried in a freeze dryer. The produce was a white powder analyzing 83% protein and dissolved completely in water at concentrations up to 10% solids to give a clear, slightly straw-colored solution. The taste was mildly acidic with a mouthfeel that was markedly superior to similar samples of soy protein that had not received the combination of phytase and acid protease.

EXAMPLE 3

This example illustrates the use of acid phytase and acid fungal protease to obtain an increased yield of acid-soluble protein from whole full-fat soybeans.

Two hundred grams of whole soybeans (38% protein) were slowly added to 1000 milliliters of water containing 12 milliliters 5N hydrochloric acid held at a temperature of 95°–100° C. The suspension was held at 95° C. for 10 minutes and then ground in a Waring Blender for 5 minutes. The slurry had a pH of 4.5 which is the isoelectric point of soy protein. The slurry was centrifuged, the solids washed one time and resuspended in 1200 milliliters water. Hydrochloric acid was added to adjust the pH to 3.2 and the slurry was divided into two equal parts. Part A was left untreated to serve as a control. Part B was treated with 0.2 gram of the phytase preparation described in Example 1 plus 0.2 gram of Miles Acid Fungal Protease.

After digestion at 50° C. for 5 hours, an aliquot of each sample was filtered and the filtrate assayed for solids and protein. The results summarized in the following tables show that the sample treated with phytase and protease contained about four times as much protein as the untreated sample.

|  | Acid Extract Total Solids, gm. | Total Protein, gm. |
|---|---|---|
| A — Control | 6.5 | 2.6 |
| B — 0.2 gm. Phytase, 0.2 gm. Protease | 16.2 | 11.3 |

EXAMPLE 4

Two thousand four hundred grams of LCP (Liquid Cyclone Process)* cottonseed flour were dispersed in 24 liters warm tap water (35°–40° C.) with the simultaneous addition of 5N hydrochloric acid to maintain pH at 4.0. The mixture was stirred for 30 minutes and centrifuged. The flour was resuspended in 12 liters tap water and hydrochloric acid added to a pH of 3.5. One gram of phytase (6000 units/gram) and 1.0 gram of acid fungal protease (Miles AFP) were added and the mixture stirred at 50° C. for 10 hours. The final pH was 3.8.

* This Liquid Cyclone Process is a known process developed at the Southern Regional Research Laboratories, USDA, for removing gossypoi pigment glands from cottonseed flour.

The digestion mixture was filtered on a Buchner funnel, washed one time and the filtrate heated to 95° C. for 10 minutes. The extract was evaporated under vacuum to approximately one-fourth volume and freeze dried to a white powder assaying 85% protein. The product was completely soluble in water and various acidulated beverages and had a mild, acceptable flavor with no objectionable "coating effect".

EXAMPLE 5

Two hundred grams of LCP cottonseed flour were dispersed in 5 liters tap water at 30° C. with hydrochloric acid added to control pH at 4.0 which is the approximate isoelectric point for cottonseed protein. After stirring for 15 minutes the flour was separated by centrifugation and resuspended in water. Hydrochloric acid was added to pH 3.2 and the slurry divided into three portions. The three samples were stirred in a 50° C. water bath and treated with (1) control, (2) 0.1 gram Miles AFP and (3) 0.1 gram Miles AFP + 0.05 gram phytase (6000 units/gram). After an 8-hour digestion period, the entire slurry was heated to 90° C. for 10 minutes, cooled and centrifuged. The acid extracts were concentrated under vacuum, analyzed for solids and protein and freeze dried. The following results were obtained:

| Sample Treatment | Total Solids (grams) | Total Protein (grams) | % Protein Yield |
|---|---|---|---|
| (1) Control | 19.3 | 16.5 | 26 |
| (2) Miles AFP | 27.5 | 23.4 | 37 |
| (3) Miles AFP + Phytase | 41.8 | 38.0 | 60 |

The results of this experiment show that a protein yield of 26% was obtained by acid extraction alone, 37% with acid fungal protease alone and 60% with a combination of phytase and protease.

EXAMPLE 6

Sesame seed was ground and the oil extracted by repeated washing with warm hexane. Four hundred grams of the defatted sesame flour were suspended in 4 liters tap water (40° C.) plus 5N hydrochloric acid to obtain pH 4.8. The mixture was stirred for 20 minutes, centrifuged and the solids washed one time. The supernatant liquid was sampled and discarded. The washed solids were resuspended in 2 liters water and acidified to pH 3.2 with hydrochloric acid. The slurry was then divided into four equal parts, each representing 100 grams original flour. The samples were treated with the phytase preparation described in Example 1 and Miles Acid Fungal Protease as shown below for 12 hours at 50° C. At 12 hours the concentration of free phosphorus in each of the four samples was as follows:

| | | |
|---|---|---|
| 1. Control | 50 | mcgm P/ml |
| 2. Phytase | 1300 | " |
| 3. Acid Fungal Protease (AFP) | 60 | " |
| 4. Phytase & AFP | 1200 | " |

At 12 hours the samples were heated to 90°–95° C. for 15 minutes, cooled, centrifuged and the solids washed one time. The acid extracts with highest protein content were evaporated and dried in a freeze dryer.

The results of this experiment tabulated below show that phytase increased the yield of protein in an acid extract of sesame flour by a factor of four. The freeze dried product of the phytase or phytase-protease treatment of sesame flour was a light tan powder assaying 83% protein.

| Material | Total Solids (gms.) | Total Protein (gms.) | % Protein Yield |
|---|---|---|---|
| Sesame Flour (90% dry substance, 56.1% protein) | 90 | 56.1 | 100 |
| Isoelectric Wash (pH 4.8) | 22.5 | 6.8 | 12.1 |
| Acid Residue | | | |
| 1. Control | 47.8 | 31.2 | 55.7 |
| 2. 0.05 grams Phytase | 39.3 | 18.5 | 33.0 |
| 3. 0.05 grams Miles AFP | 53.9 | 35.0 | 62.5 |
| 4. 0.05 grams Phytase + 0.05 grams Miles AFP | 37.6 | 18.1 | 32.3 |
| Acid Extract | | | |
| 1. Control | 8.9 | 6.75 | 12.0 |
| 2. Phytase | 33.8 | 30.0 | 53.5 |
| 3. Acid Fungal Protease | 11.7 | 9.2 | 16.4 |
| 4. Phytase + Protease | 28.4 | 25.4 | 45.5 |
| Freeze Dried Extract | Weight | % Protein | |
| 2 | 32 | 83.3 | |
| 4 | 30 | 83.5 | |

EXAMPLE 7

The procedure for handling rapeseed was different from the previous examples because of the need to remove toxic constituents from the rapeseed. Detoxification was accomplished by immersing the whole rapeseed in boiling water for 2 minutes followed by steeping in dilute acid to extract the toxic material. The rapeseed was then dried, ground and extracted with hexane. In this case the acid steeping step before defatting served the same purpose as the isoelectric wash performed on the other materials after defatting.

Three 50-gram samples of the defatted rapeseed meal were suspended in water at pH 2.8 and digested with enzymes in the same manner as described in Example 6. After digestion the extracts were separated and recovered as before.

The results tabulated below show that treating rapeseed with phytase increased the yield of protein by a factor of 2.

| Material | Total Solids (gms.) | Total Protein (gms.) | % Protein Yield |
|---|---|---|---|
| Whole Rapeseed (Boiling water — 2 min., acid steeping — 24 hours, dry, grind, extract with hexane.) | | | |
| Defatted Meal (96% D.S., 40% Protein) | 48 | 20 | 100 |
| Acid Extraction Residue (pH 2.8) | | | |
| 1. Control | 36.7 | 15.2 | 76 |
| 2. 0.025 gm. Phytase | 29.3 | 8.8 | 44 |
| 3. Phytase + 0.025 gm. Acid Fungal Protease | 30.9 | 9.8 | 49 |
| Acid Extract | | | |
| 1. Control | 8.9 | 5.0 | 25 |
| 2. Phytase | 16.2 | 11.8 | 60 |
| 3. Phytase + Acid Fungal Protease | 14.7 | 10.1 | 51 |
| Freeze Dried Extract | % Protein | Color | Flavor |
| 1 | 50.5 | Tan | Very Bitter |
| 2 | 62.1 | Tan | Bitter |
| 3 | 61.3 | Tan | Fairly Mild |

EXAMPLE 8

This example shows how the degree of proteolysis in products of the present invention is related to taste.

Three 100-gram samples of cottonseed flour were dispersed in water at pH 5, mixed 15 minutes and centrifuged. The supernatant liquid was discarded and the residue redispersed in one liter fresh water and adjusted to pH 3.8 with hydrochloric acid. Each sample was treated with 0.04% phytase (18,000 units/gram) and 0, 0.2% and 0.5% Milezyme Acid Fungal Protease, respectively. After digestion at 50° C. for 15 hours, the samples were heated to 90° C. for 10 minutes, centrifuged and the extracts freeze dried. A fourth sample was prepared by alkaline extraction of cottonseed flour and isoelectric precipitation of the protein at pH 5. The solubility of the samples in TCA and relative taste characteristics are given in the following table:

| Sample | Phytase | Treatment Protease | % Soluble TCA | Taste 2% Aqueous Solution |
|---|---|---|---|---|
| A | .04% | 0 | 55 | Bland |
| B | .04% | 0.02% | 75 | Bland |
| C | .04% | 0.50% | 100 | Bitter, hydrolyzed protein taste |

| Sample | Treatment Phytase Protease | % Soluble TCA | Taste 2% Aqueous Solution |
|---|---|---|---|
| D | isoelectric ppt. | 1 | Very astringent |

The present invention provides a practical means of increasing the protein extraction efficiency under acidic conditions for many oilseed proteins and thereby improves the opportunity of utilizing more vegetable proteins in human food products. The protein products obtained by the present process are superior to those of the prior art with respect to solublity, clarity, and taste under mildly acidic conditions, i.e. pH 3–5, and therefore are potentially useful for protein fortification of acid beverages and foods.

The use of an acid phytase to facilitate the extraction of vegetable protein is also advantageous in that it reduces the amount of acid required to solubilize the protein which means less salt is formed when the extract is neutralized. For example, soy protein can be readily extracted at pH 3.5 when treated with phytase but must be acidified to pH 2 to obtain a comparable protein extraction without phytase.

Another advantage of the present process is that the acid conditions used when phytase and protease are employed together reduces the chance of microbial contamination which is a serious problem with neutral or slightly alkaline extraction processes. The problem of undesirable color formation under alkaline conditions is also reduced by extracting under acid conditions.

Another advantage of the present process is that it provides a practical means of removing phytic acid from vegetable proteins used in food products. The phytic acid complexes with protein and reduces the solubility of the protein. It is probably the action of the phytase on the phytic acid, breaking it down into inositol and orthophosphate which, in turn, breaks the phytic acid-protein complex and allows the protein to be extracted. There are some reports in the literature which indicate that some proteins are more efficiently utilized for food after the phytic acid-protein complex is broken. It is also known that phytic acid is undesirable in certain diets because it ties up calcium, zinc, iron and other essential minerals and thereby causes dietary deficiencies. The present process provides a simple method of removing phytic acid from vegetable protein products and thereby reduces the dietary problems caused by phytic acid.

Those modifications and equivalents which fall within the spirit of the invention are to be considered a part thereof.

What is claimed is:

1. A process of obtaining protein from a vegetable protein source material which comprises washing a vegetable protein source material with water maintained at a pH of minimum protein solubility, subjecting the washed vegetable protein source material to digestion in water at a pH of from about 2 to 6 in the presence of acid phytase, and separating a liquid extract containing soluble protein from the insoluble digestion residue.

2. A process in accordance with claim 1 wherein the washed vegetable protein source material is subjected to digestion with an acid-fungal protease.

3. A process in accordance with claim 1 wherein the said digestion is carried out at a pH of about 3 to 5.

4. A process in accordance with claim 1 wherein prior to separating a liquid extract containing soluble protein from the insoluble digestion residue, the entire digestion mixture is heated to a temperature sufficient to inactivate enzymes present therein.

5. A process in accordance with claim 1 wherein after separation of the liquid extract containing soluble protein from the insoluble digestion residue, the said liquid extract is heated to a temperature sufficient to inactivate enzymes present therein.

* * * * *